(12) United States Patent
Tamura et al.

(10) Patent No.: US 7,358,207 B2
(45) Date of Patent: Apr. 15, 2008

(54) DIELECTRIC CERAMIC COMPOSITION AND MULTILAYER ELECTRONIC COMPONENT

(75) Inventors: Hiroshi Tamura, Echizen (JP); Harunobu Sano, Kyoto (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 151 days.

(21) Appl. No.: 10/582,203

(22) PCT Filed: Dec. 10, 2004

(86) PCT No.: PCT/JP2004/018468

§ 371 (c)(1), (2), (4) Date: Jun. 9, 2006

(87) PCT Pub. No.: WO2005/058774

PCT Pub. Date: Jun. 30, 2005

(65) Prior Publication Data

US 2007/0087931 A1    Apr. 19, 2007

(30) Foreign Application Priority Data

Dec. 18, 2003   (JP)   ............... 2003-420245

(51) Int. Cl.
*C04B 35/47*   (2006.01)
*C04B 35/20*   (2006.01)

(52) U.S. Cl. ............... 501/136; 501/122; 361/321.4; 361/321.5

(58) Field of Classification Search ............... 501/122, 501/136; 361/321.4, 321.5
See application file for complete search history.

(56) References Cited

U.S. PATENT DOCUMENTS

| | | | |
|---|---|---|---|
| 5,786,978 A | 7/1998 | Mizuno | |
| 6,137,672 A * | 10/2000 | Mizuno et al. | 361/321.4 |
| 6,346,161 B1 * | 2/2002 | Mizuno et al. | 156/89.12 |
| 6,514,895 B1 * | 2/2003 | Chiu et al. | 501/137 |

FOREIGN PATENT DOCUMENTS

| | | |
|---|---|---|
| JP | 6-48666 | 6/1994 |
| JP | 06-333429 | 12/1994 |
| JP | 10-17359 | 1/1998 |
| JP | 2002-68829 | 3/2002 |
| JP | 2004-131320 | 4/2004 |

OTHER PUBLICATIONS

Written Opinion Of The International Searching Authority dated Apr. 5, 2005.

* cited by examiner

*Primary Examiner*—Karl E Group
(74) *Attorney, Agent, or Firm*—Dickstein Shapiro LLP

(57) ABSTRACT

A dielectric ceramic composition of the present invention is represented by the general formula, $Mg_xSiO_{2+x}+aSr_yTiO_{2+y}$, wherein x, y and a satisfy the relations of $1.70 \leq x \leq 1.99$, $0.98 \leq y \leq 1.02$, and $0.05 \leq a \leq 0.40$, respectively.

2 Claims, 1 Drawing Sheet

DIELECTRIC CERAMIC COMPOSITION AND MULTILAYER ELECTRONIC COMPONENT

TECHNICAL FIELD

The present invention relates to a dielectric ceramic composition and a multilayer electronic component, and specifically to a dielectric ceramic composition and a multilayer electronic component which can be suitably used for temperature compensation.

BACKGROUND ART

Known examples of this type of conventional dielectric ceramic composition include a dielectric ceramic composition for high frequencies proposed by the applicant of the present invention in Patent Document 1. The dielectric ceramic composition includes a ceramic composition represented by the general formula $xMgO\text{-}ySiO_2$ (wherein x and y represents the percent by weight of respective elements and satisfy $40 \leq x \leq 85$, $15 \leq y \leq 60$, and $x+y=100$) and one or both of a material (Ba source) converted to a barium oxide by sintering and a material (Sr source) converted to a strontium oxide by sintering. The Ba source and the Sr source are added at a total content of 0.3 to 3.0% by weight in terms of $BaCO_3$ and $SrCO_3$.

Patent Document 2 discloses a multilayer ceramic capacitor including two or more types of ceramic dielectric layers having different dielectric characteristics. In the multilayer ceramic capacitor, dielectric layers and conductor layers are alternately laminated, and the conductor layer is disposed on at least one of the surfaces of each dielectric layer. In addition, a glass material paste layer is formed over the entire surface of each dielectric layer, including the conductor layer, to form an adhesive layer including the glass material paste layer and the conductor layer. The conductor layer of the adhesive layer is used for forming a predetermined pattern, and a ceramic thin sheet is bonded to one or both of the glass material paste layer and the conductor layer. The conductor layers are composed of a conductor paste or conductive adhesive, and the dielectric layers are formed by laminating at least one each of two or more dielectric ceramic thin sheets separately formed and having different dielectric characteristics.

Patent Document 3 discloses a dielectric ceramic composition for high frequencies composed of forsterite, zinc titanate, and calcium titanate. The dielectric ceramic composition has a composition represented by the general formula $xMg_2SiO_4\text{-}yZn_2TiO_4\text{-}zCaTiO_3$ (wherein x, y, and z are shown by mol % and satisfy $21<x<88$, $4<y<71$, $4 \leq z \leq 14$, and $x+y+z=100$).

Patent Document 1: Japanese Patent No. 3446249
Patent Document 2: Japanese Examined Patent Application Publication No. 6-48666
Patent Document 3: Japanese Unexamined Patent Application Publication No. 2004-131320

DISCLOSURE OF INVENTION

Problem to be Solved by the Invention

The dielectric ceramic composition for high frequencies of Patent Document 1 can be sintered at a lower temperature than that of conventional forsterite ($Mg_2SiO_4$) and has a high Q factor and high dielectric constant. Therefore, the composition can be preferably used as a material for use in, for example, circuit element substrates used in the microwave band, such as microwave integrated circuits, and dielectric resonator supports. However, the composition has a firing temperature of as high as 1350° C. to 1400° C. and still has a problem in use as a multilayer capacitor material because of its high firing temperature.

The multilayer ceramic capacitor of Patent Document 2 is produced by laminating, through adhesive layers, two or more types of dielectric ceramic thin sheets having different dielectric characteristics, for example, dielectric ceramic thin sheets having positive and negative temperature coefficients. The dielectric ceramic thin sheets having different dielectric characteristics are separately produced and bonded together with an adhesive including a glass material paste and a conductor paste to produce a laminate, followed by firing. Therefore, the process for manufacturing the multilayer ceramic capacitor is complicated and takes much time. In addition, a structural defect may occur due to a difference between the thermal shrinkage coefficients of the ceramic layers and the adhesive layers each including the glass material paste and the conductor paste, thereby causing the problem of difficulty in realizing miniaturization and multilayering of a ceramic capacitor.

In the dielectric ceramic composition for high frequencies described in Patent Document 3, the dielectric constant can be controlled in a range of 8 to 20, the product $Q \times f_0$ of resonance frequency $f_0$ and Q factor is high, and the absolute value of the temperature coefficient $\tau_f$ of the resonance frequency $f_0$ is 30 ppm/° C. or less and can be easily controlled. However, the firing temperature is as high as 1300° C. to 1500° C., and $CaTiO_3$, used as a material having negative temperature characteristics, has a negative gradient of as low as −1500 ppm/° C. Therefore, in order to achieve a temperature characteristic of 0 ppm/° C., a large amount of $CaTiO_3$ must be added, resulting in the problem of increasing the dielectric constant to 16 at 0 ppm/° C.

The present invention has been achieved for solving the above-mentioned problems, and an object is to provide a dielectric ceramic composition and a multilayer electronic component which permit firing at a lower temperature than that of conventional forsterite, controlable to predetermined dielectric constant temperature characteristics, and multilayerable without causing a structural defect in designing a low-capacity, small, multilayer electronic component, and which are capable of decreasing the equivalent series resistance, suppressing variation in capacitance, and satisfying the JIS standard characteristics including CG to CK, LG to LK, PG to PK, RG to RK, SH to SK, TH to TK, UH to UK, and SL properties (abbreviated to "CG to SL properties" hereinafter).

Means for Solving the Problems

A dielectric ceramic composition of the present invention is represented by the general formula, $Mg_xSiO_{2+x}+aSr_yTiO_{2+y}$, wherein x, y and a satisfy the relations of $1.70 \leq x \leq 1.99$, $0.98 \leq y \leq 1.02$, and $0.05 \leq a \leq 0.40$, respectively.

A multilayer electronic component according to the present invention includes a laminate of a plurality of dielectric ceramic layers, internal electrodes disposed between the respective dielectric ceramic layers, and external electrodes electrically connected to the internal electrodes. The dielectric ceramic layers are formed using the dielectric ceramic composition of the invention.

In other words, the dielectric ceramic composition of the present invention is represented by the general formula, $Mg_xSiO_{2+x}+aSr_yTiO_{2+y}$. This dielectric ceramic composition is basically formed by adding a predetermined amount of strontium titanate (SrTiO₃) having negative temperature characteristics to forsterite (Mg₂SiO₄) having positive temperature characteristics, a low dielectric constant, and excellent high-frequency properties to produce a mixed crystal of forsterite and strontium titanate so that the dielectric constant can be decreased, the temperature characteristics can be easily controlled, and a desired temperature coefficient can be obtained. As a result, it is possible to obtain a dielectric ceramic composition having temperature characteristics in a wide range from the JIS standard CG to SL characteristics required for temperature compensation applications. Therefore, the dielectric ceramic composition of the present invention is suitable for use in manufacturing multilayer electronic components such as a low-capacity ceramic capacitor for temperature compensation and the like.

In the dielectric ceramic composition of the present invention, the $Sr_yTiO_{2+y}$ molar ratio a (=$Sr_yTiO_{2+y}/Mg_xSiO_{2+x}$) to $Mg_xSiO_{2+x}$ satisfies the relation of $0.05 \leq a \leq 0.40$. Since the temperature coefficient of capacitance TCC continuously varies to the minus side as the content a of the strontium titanate added increases, the temperature coefficient can be controlled to a desired value by controlling the value of a. Namely, when the value of a satisfies the range of the present invention, a dielectric ceramic composition satisfying the temperature characteristics in a wide range from the JIS standard CG to SL characteristics can be obtained. When the value of a is less than 0.05, the temperature characteristics of forsterite dominate, and thus the temperature characteristics may not be improved. In addition, when the value of a exceeds 0.4, the rate of change in capacitance with temperature is excessively increased negatively, and the dielectric constant ∈r may be increased. However, in applications in which the temperature characteristics must be more negative than the SL characteristics, the value of a is controlled to 0.40 or more in order to realize such temperature characteristics.

In the dielectric ceramic composition of the present invention, x in the general formula satisfies the relation $1.70 \leq x \leq 1.99$. As described above, the sintering temperature of conventional forsterite is as high as 1350° C. to 1400° C. However, in the dielectric ceramic composition of the present invention, the ratio (Mg/Sr=x) of Mg to Sr is controlled in the above-described range, and strontium titanate is further added to significantly improve sinterability. Therefore, the ceramic composition can be sufficiently sintered at about 1100° C. to 1300° C. which is lower than that of conventional forsterite-type dielectric ceramic compositions without using a sintering aid such as low-melting-point glass or the like. However, when x is less than 1.70, a Mg₂SiO₄ phase and a SrTiO₃ phase are not produced, and the temperature characteristics required for, for example, multilayer electronic components for temperature compensation, may not be improved. Furthermore, when x exceeds 1.99, the sintering temperature of the dielectric ceramic composition cannot be decreased, and the dielectric ceramic composition may not be sintered in a low temperature range of up to about 1300° C. which does not adversely affect internal electrodes of multilayer electronic components, for example, in forming the internal electrodes using an Ag—Pd alloy, Pd, or the like.

Furthermore, in the dielectric ceramic composition of the present invention, y in the above-described general formula satisfies the relation $0.98 \leq y \leq 1.02$. The temperature characteristics can be stabilized and controlled to target temperature characteristics by controlling the Sr ratio (Sr/Ti=y) to Ti of strontium titanate. In the present invention, the above-described range of y is satisfied so that the temperature characteristics can be stabilized in a wide range from the JIS standard CG characteristics (temperature coefficient of capacitance TCC=0±30 ppm/° C. or less) to the SL characteristics (temperature coefficient of capacitance TCC=+350 to −1000 ppm/° C. or less). When y is less than 0.98 or exceeds 1.02, a Mg₂SiO₄ phase and a SrTiO₃ phase are not stably produced, and thus the temperature characteristics may not be improved.

In the multilayer electronic component of the present invention, therefore, the dielectric ceramic layers are formed using the dielectric ceramic composition of the present invention. By using the dielectric ceramic composition of the present invention for forming the dielectric ceramic layers of the multilayer electronic component, firing can be performed at a lower temperature, of about 1100° C. to 1300° C., than that for conventional forsterite without using a sintering aid, and the resulting multilayer electronic component of the present invention has a low dielectric constant and flattened temperature characteristics. When the dielectric ceramic composition of the present invention is used for the multilayer electronic component of the present invention, the number of the stacked dielectric ceramic layers can be increased because the dielectric ceramic composition of the present invention has a low dielectric constant, thereby achieving the multilayer electronic component with a low equivalent series resistance and small variation in capacitance.

The internal electrodes constituting the multilayer electronic component of the present invention are formed using a conductive material which is capable of forming the internal electrodes at the firing temperature of the dielectric ceramic composition of the present invention. The conductive material for the internal electrodes is not particularly limited, and generally-known conductive materials, such as palladium (Pd) and palladium-silver (Pd—Ag) alloys are preferably used. Since, as described above, firing can be performed at a low temperature of up to 1300° C., neither breakage in the internal electrodes nor structural defects occurs in forming the multilayer electronic component even using Ag/Pd or Pd for the internal electrodes. The external electrodes constituting the multilayer electronic component are formed using a generally known conductive material. Unlike for the internal electrodes, the conductive material for the external electrodes is not limited with respect to firing, but a conductive material according to the internal electrodes is preferably used.

ADVANTAGE OF THE INVENTION

According to the present invention, there is provided a dielectric ceramic composition and a multilayer electronic component which permit firing at a lower temperature than that of conventional forsterite, control to predetermined dielectric temperature characteristics, and multilayering without structural defects in designing a small, low-capacity multilayer electronic component, and which are capable of decreasing equivalent series resistance, suppressing variation in capacitance, and satisfying the characteristics in a range from CG to SL characteristics required for temperature compensation capacitors.

BEST MODE FOR CARRYING OUT THE INVENTION

The present invention will be described on the basis of an embodiment shown in FIG. 1. FIG. 1 is a sectional view schematically showing a multilayer electronic component according to the embodiment of the present invention.

As shown in FIG. 1, a multilayer electronic component 1 (specifically, a multilayer ceramic capacitor) according to the embodiment includes a laminate 4 including a plurality of stacked dielectric ceramic layers 2, and a plurality of first and second internal electrodes 3A and 3B disposed between the respective dielectric ceramic layers 2. Furthermore, first and second external electrodes 5A and 5B are formed at both end surfaces of the laminate 4 so as to be electrically connected to the first and second internal electrodes 3A and 3B, respectively.

As shown in FIG. 1, each of the first internal electrodes 3A is extended from one of the ends (the left end in the drawing) of the corresponding dielectric ceramic layer 2 to the vicinity of the other end (the right end), and each of the second internal electrodes 3B is extended from the right end of the corresponding dielectric ceramic layer 2 to the vicinity of the left end. The first and second internal electrodes 3A and 3B are formed using, for example, a Pd—Ag alloy.

As shown in FIG. 1, the first external electrode 5A is electrically connected to the first internal electrodes 3A in the laminate 4, and the second external electrode 5B is electrically connected to the second internal electrodes 3B in the laminate 4. The first and second external electrodes 5A and 5B are formed using, for example, an Ag—Pd alloy. Furthermore, generally known first plating layers 6A and 6B and second plating layers 7A and 7B are successively provided on the surfaces of the first and second external electrodes 5A and 5B, respectively.

EXAMPLES

Next, the present invention will be described on the basis of an example. In this example, a plurality of dielectric ceramic compositions shown in Table 1 was prepared according to the procedures described below, and multilayer ceramic capacitors were prepared using the respective dielectric ceramic compositions. Next, the resulting multilayer ceramic capacitors were evaluated. The results are shown in Table 1. In Table 1, samples outside the range of the present invention are marked with *.

(1) Preparation of Dielectric Ceramic Composition

First, high-purity MgO, $SiO_2$, $SrCO_3$, and $TiO_2$ were prepared as starting raw materials and weighed to prepare the compositions of sample Nos. 1 to 18 shown in Table 1. The raw materials of each of the samples were wet-mixed and ground using a ball mill to prepare a slurry. Then, the slurry of each sample was dried by evaporation and temporarily fired in air at 1000° C. for 2 hours. Next, the temporarily fired powders were dry-ground to obtain dielectric ceramic compositions.

A dielectric ceramic composition may be prepared by a method other than the above-mentioned method as follows: First, MgO and $SiO_2$ are mixed and ground, and the resultant mixture is temporarily fired to synthesize forsterite. Next, $SrCO_3$ and $TiO_2$ are mixed and ground, and the resultant mixture is temporarily fired to synthesize $SrTiO_3$. The synthesized forsterite and $SrTiO_3$ are mixed with $MgCO_3$ for controlling the Mg/Si molar ratio to prepare a dielectric ceramic composition having each composition shown in Table 1.

Samples Nos. 1 to 9 are dielectric ceramic compositions prepared for measuring the influence of the content a of strontium titanate by changing the $Sr_yTiO_{2+y}$ molar ratio to $Mg_xSiO_{2+x}$ ($=Sr_yTiO_{2+y}/Mg_xSiO_{2+x}$) from the range of the present invention to a value (a=0.04 or 0.42) outside the range of the present invention at the Mg/Si (=x) and Sr/Ti (=y) ratios set to 1.90 and 1.00, respectively, within the range of the present invention.

Samples Nos. 10 to 14 are dielectric ceramic compositions prepared for measuring the influence of x by changing the Mg/Si (=x) ratio from the range of the present invention to a value (x=1.60 or 2.00) outside the range of the present invention at the content a of strontium titanate and y set to 0.10 and 1.00, respectively, within the range of the present invention.

Samples Nos. 15 to 18 are dielectric ceramic compositions prepared for measuring the influence of y by changing the ratio y from the range of the present invention to a value (y=0.97 or 1.03) outside the range of the present invention at a content a and y set to 0.10 and 1.90, respectively, within the range of the present invention.

The dielectric ceramic compositions prepared as described above have no significant effect on electric characteristics even when containing CaO, BaO, $ZrO_2$, $Al_2O_3$, $Fe_2O_3$, $B_2O_3$, or the like.

(2) Preparation of Multilayer Ceramic Capacitor

Each of the dielectric ceramic compositions prepared in (1) was weighed, and predetermined additives, a polyvinyl butyral binder, and an organic solvent such as ethanol were added to the composition. The resultant mixture was wet-mixed using a ball mill to prepare a ceramic slurry.

Thereafter, the ceramic slurry was formed into a ceramic green sheet by a doctor blade method, and a conductive paste containing Pd as a main component was applied onto the ceramic green sheet by printing. The ceramic green sheets were stacked so that the resultant multilayer ceramic capacitor contained ten effective layers, pressure-bonded together, and then cut into chip dimensions to obtain a ceramic green laminate.

Next, the resultant ceramic green laminate was heated in air at 350° C. to remove the binder, heated in air to 1200° C. at a heating rate of 50° C./min, and fired at this temperature for 10 minutes to prepare sample Nos. 1 to 6, 9, 10, and 13 to 18. The other sample Nos. 7, 8, 11, and 12 were prepared by heating the ceramic green laminates to 1100° C. and then firing at this temperature for 2 hours. Although the heating rate may be 5° C./min such as generally found in firing conditions for multilayer ceramic capacitors, a heating rate of as high as 50° C./min can improve the insulation resistance of a multilayer ceramic capacitor. Each of the thus-prepared multilayer ceramic capacitors had chip dimensions of 2.0 mm×1.2 mm×1.2 mm and an element thickness of 5 μm. After the firing, first and second external electrodes were formed, and then plating was performed in two steps on the surfaces of the external electrodes to form first and second plating layers, thereby preparing evaluation sample Nos. 1 to 18.

(3) Characteristic Evaluation of Multilayer Ceramic Capacitor

For each of sample Nos. 1 to 18, capacitance and Q factor were measured at 25° C., 1 MHz, and 1 V using a LCR meter (4284A manufactured by HP Corporation), and dielectric constants εr were calculated on the basis of the measured values, the electrode area, and the element thickness. The results are shown in Table 1. For each of the samples, capacitance was measured using a capacitance temperature characteristic measuring device, and the temperature coefficient of capacitance TCC of each sample was calculated according to the equation below. The results are also shown in Table 1.

$$TCC\ [ppm/°C.] = \{(C_{85} - C_{20})/C_{20}\} \times \{1/(85-20)\} \times 10^6$$

$C_{20}$: capacitance at 20° C.

$C_{85}$: capacitance at 85° C.

TABLE 1

| | Composition | | | Characteristics | | |
|---|---|---|---|---|---|---|
| | $Mg_xSiO_{2+x}$ + $aSr_yTiO_{2+y}$ | | | | | Temperature |
| Sample No. | $SrTiO_3$ a | Mg/Si x | Sr/Ti y | εr | Q 1 MHz | TCC ppm/°C. | characteristic standard |
| * No. 1 | 0.04 | 1.90 | 1.00 | 7 | 2970 | 100 | — |
| No. 2 | 0.05 | 1.90 | 1.00 | 8 | 2780 | 25 | CG |
| No. 3 | 0.10 | 1.90 | 1.00 | 10 | 2450 | −20 | CG |
| No. 4 | 0.15 | 1.90 | 1.00 | 12 | 2220 | −55 | CH |
| No. 5 | 0.20 | 1.90 | 1.00 | 14 | 2010 | −315 | SH |
| No. 6 | 0.25 | 1.90 | 1.00 | 16 | 1920 | −485 | TH |
| No. 7 | 0.35 | 1.90 | 1.00 | 18 | 1750 | −785 | UJ |
| No. 8 | 0.40 | 1.90 | 1.00 | 22 | 1650 | −995 | SL |
| * No. 9 | 0.42 | 1.90 | 1.00 | 26 | 1510 | −1120 | — |
| * No. 10 | 0.10 | 1.60 | 1.00 | 8 | 2350 | 115 | — |
| No. 11 | 0.10 | 1.70 | 1.00 | 9 | 2450 | 60 | CH |
| No. 12 | 0.10 | 1.97 | 1.00 | 10 | 2500 | −25 | CG |
| No. 13 | 0.10 | 1.99 | 1.00 | 10.2 | 2530 | −50 | CH |
| * No. 14 | 0.10 | 2.00 | 1.00 | *1 | *1 | *1 | *1 |
| * No. 15 | 0.10 | 1.90 | 0.97 | 8 | 2800 | 100 | — |
| No. 16 | 0.10 | 1.90 | 0.98 | 9 | 2600 | 25 | CG |
| No. 17 | 0.10 | 1.90 | 1.02 | 10 | 2500 | −25 | CG |
| * No. 18 | 0.10 | 1.90 | 1.03 | 9 | 2300 | 100 | — |

*1: not sintered

The results shown in Table 1 indicate that among sample Nos. 1 to 9 for measuring the influence of the $SrTiO_3$ content a relative to $Mg_xSiO_{2+x}$, sample Nos. 2 to 8 having a within the range 0.05≦a≦0.40 of the present invention show continuous changes of the temperature coefficient to the minus side with increases in the $SrTiO_3$ content a. It is thus found that the temperature coefficient of capacitance TCC can be controlled to a desired value by controlling the $SrTiO_3$ content a. Therefore, the resultant dielectric ceramic compositions have rates of change in capacitance with temperature TCC which satisfy the temperature characteristics in a wide range from the JIS standard CG to SL characteristics. In this case, a dielectric constant εr of as low as 7 to 22 can be realized.

In particular, in sample Nos. 2 to 4 having a $SrTiO_3$ content a in the range of 0.05≦a≦0.15, it is found that the dielectric constants εr are 12 or less, the temperature coefficients of capacitance TCC are 0±60 ppm/°C. or less which satisfy the CG or CH characteristics, and the temperature characteristics are satisfactorily flattened.

On the other hand, in sample No. 1 having a $SrTiO_3$ content a of 0.04, lower than 0.05, it is found that the rate of change in capacitance with temperature TCC is positive large, and thus the effect of $SrTiO_3$ addition is not observed. It is also found that the temperature characteristics are not improved. In sample No. 9 having a $SrTiO_3$ content a of 0.42, exceeding 0.40, it is found that the rate of change in capacitance with temperature TCC is a large negative, and the dielectric constant εr is also as high as 26.

The results shown in Table 1 also indicate that among sample Nos. 10 to 14 for measuring the influence of Mg/Si (=x), sample Nos. 11 to 13 having x in the range 1.70≦x≦1.99 of the present invention show dielectric constants εr of 22 or less and rates of change in capacitance with temperature TCC which satisfy the CH or CG temperature characteristics.

On the other hand, it is also found that sample No. 10 having x of 1.6, less than 1.70, does not stably produce a mixed crystal including $Mg_2SiO_4$ and $SrTi_3O$ phases, thereby failing to improve the temperature characteristics. It is further found that sample No. 14 having x of 2.0, exceeding 1.99, causes an increase in the sintering temperature and thus cannot be sintered at 1300° C. in a temperature range which causes no adverse effect on internal electrodes.

The results shown in Table 1 further indicate that among sample Nos. 15 to 18 for measuring the influence of Sr/Ti (=y), sample Nos. 16 and 17 having y in the range 0.98≦y≦1.02 of the present invention can be sintered at about 1200° C. and have temperature characteristics stabilized and controlled to the desired temperature characteristics, dielectric constants εr of 22 or less, and rates of change in capacitance with temperature TCC which satisfy the CG or CH characteristics.

On the other hand, it is further found that sample No. 10 having y of 0.97, less than 0.98, has a rate of change in capacitance with temperature TCC which does not satisfy the CG and CH characteristics, thereby failing to improve the temperature characteristics. It is further found that like sample No. 10, sample No. 18 having y exceeding 1.02 has a rate of change in capacitance with temperature TCC which does not satisfy the CG and CH characteristics, thereby failing to improve the temperature characteristics.

According to the example of the present invention, as descried above, by using a dielectric ceramic composition represented by the general formula $Mg_xSiO_{2+x} + aSr_yTiO_{2+y}$ wherein x, y and a satisfy the relations of 1.70≦x≦1.99, 0.98≦y≦1.02, and 0.05≦a≦0.40, respectively, for a multilayer ceramic capacitor, firing can be performed at a low temperature of 1100° C. to 1200° C., and a multilayer ceramic capacitor having a dielectric constant of as low as 22 or less and satisfying the temperature characteristics in a wide range of the JIS standard CG to SL characteristics can be obtained.

Although, a multilayer ceramic capacitor was prepared in the example as a multilayer electronic component, the present invention can be applied to the preparation of other multilayer electronic components such as a LC filter, a multilayer substrate, and the like as well as a multilayer ceramic capacitor. Although a multilayer ceramic capacitor of a size of 2.0 mm×1.2 mm has been described above, a smaller multilayer ceramic capacitor of a size of, for example, 1.0 mm×0.5 mm, 0.6 mm×0.3 mm, or 0.4 mm×0.2 mm, can be multilayered without causing a structural defect during design because the dielectric constant is as low as 22 or less, thereby decreasing the equivalent series resistance and suppressing variation in capacitance. An application in which the temperature characteristics are more negative than −1000 ppm/°C. can be achieved by increasing the $SrTiO_3$ content a relative to $Mg_2SiO_4$ to 0.40 or more outside the range of the present invention.

INDUSTRIAL APPLICABILITY

The present invention can be suitably applied to multilayer electronic components such as a low-capacity multilayer ceramic capacitor for temperature compensation and the like.

BRIEF DESCRIPTION OF THE DRAWING

FIG. 1 is a sectional view schematically showing a multilayer electronic component according to an embodiment of the present invention.

REFERENCE NUMERALS

Figure 1:
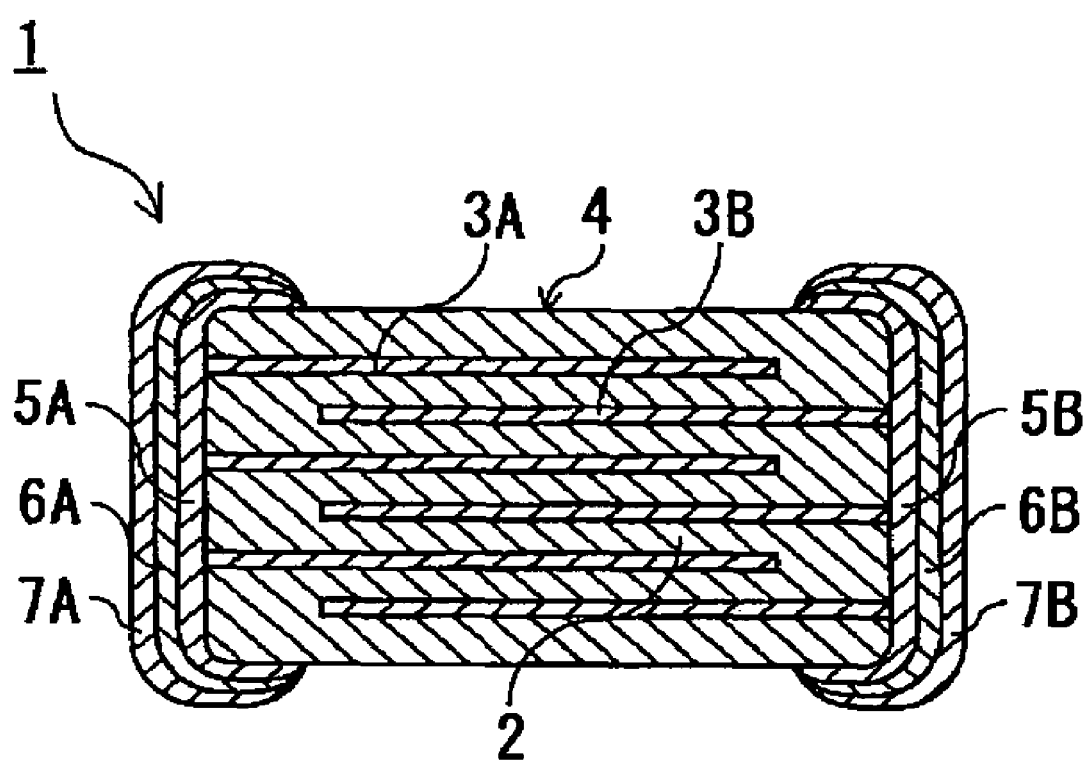
[FIG. 1]

1 multilayer ceramic capacitor
2 dielectric ceramic layer
3A, 3B first and second internal electrodes
5A, 5B first and second external electrodes

The invention claimed is:

1. A dielectric ceramic composition represented by the general formula, $Mg_xSiO_{2+x}+aSr_yTiO_{2+y}$, wherein x, y and a satisfy the relations of $1.70 \leqq x \leqq 1.99$, $0.98 \leqq y \leqq 1.02$, and $0.05 \leqq a \leqq 0.40$, respectively.

2. A multilayer electronic component comprising a laminate of a plurality of dielectric ceramic layers, internal electrodes disposed between dielectric ceramic layers, and external electrodes electrically connected to the internal electrodes, wherein the dielectric ceramic layers are formed using the dielectric ceramic composition according to claim 1.

* * * * *